United States Patent [19]

Eller

[11] 4,188,788
[45] Feb. 19, 1980

[54] HYDRAULIC TURBINE SYSTEM

[76] Inventor: James D. Eller, 281 SE. 18th Ave., Deerfield Beach, Fla. 33441

[21] Appl. No.: 915,504

[22] Filed: Jun. 14, 1978

[51] Int. Cl.² .................... F03B 13/10; F15B 15/18
[52] U.S. Cl. .................................. 60/398; 290/52; 405/78; 417/334
[58] Field of Search ............ 60/398, 403, 405, 456, 60/495, 501, 698; 290/43, 52, 54; 405/75, 78; 417/330, 331, 334

[56] References Cited

U.S. PATENT DOCUMENTS

| | | | |
|---|---|---|---|
| 1,955,154 | 4/1934 | Temple | 91/420 X |
| 2,019,353 | 10/1935 | Lower | 60/383 X |
| 2,232,428 | 2/1941 | Benedek | 60/494 X |
| 2,554,381 | 5/1951 | Patterson | 60/413 X |
| 3,675,112 | 7/1972 | Smith | 60/413 X |
| 3,912,938 | 10/1975 | Filipenco | 417/330 X |

*Primary Examiner*—Edgar W. Geoghegan
*Attorney, Agent, or Firm*—Oltman and Flynn

[57] ABSTRACT

The hydraulic turbine system includes:
  an electric generator;
  rotary turbine blades;
  a hydraulic pump for operation by rotation of the turbine blades;
  a hydraulic motor for driving the generator;
  a hydraulic reservoir;
  and connections between the pump, the motor and the reservoir for causing the motor to operate in response to rotation of the turbine blades by water flow.

5 Claims, 6 Drawing Figures

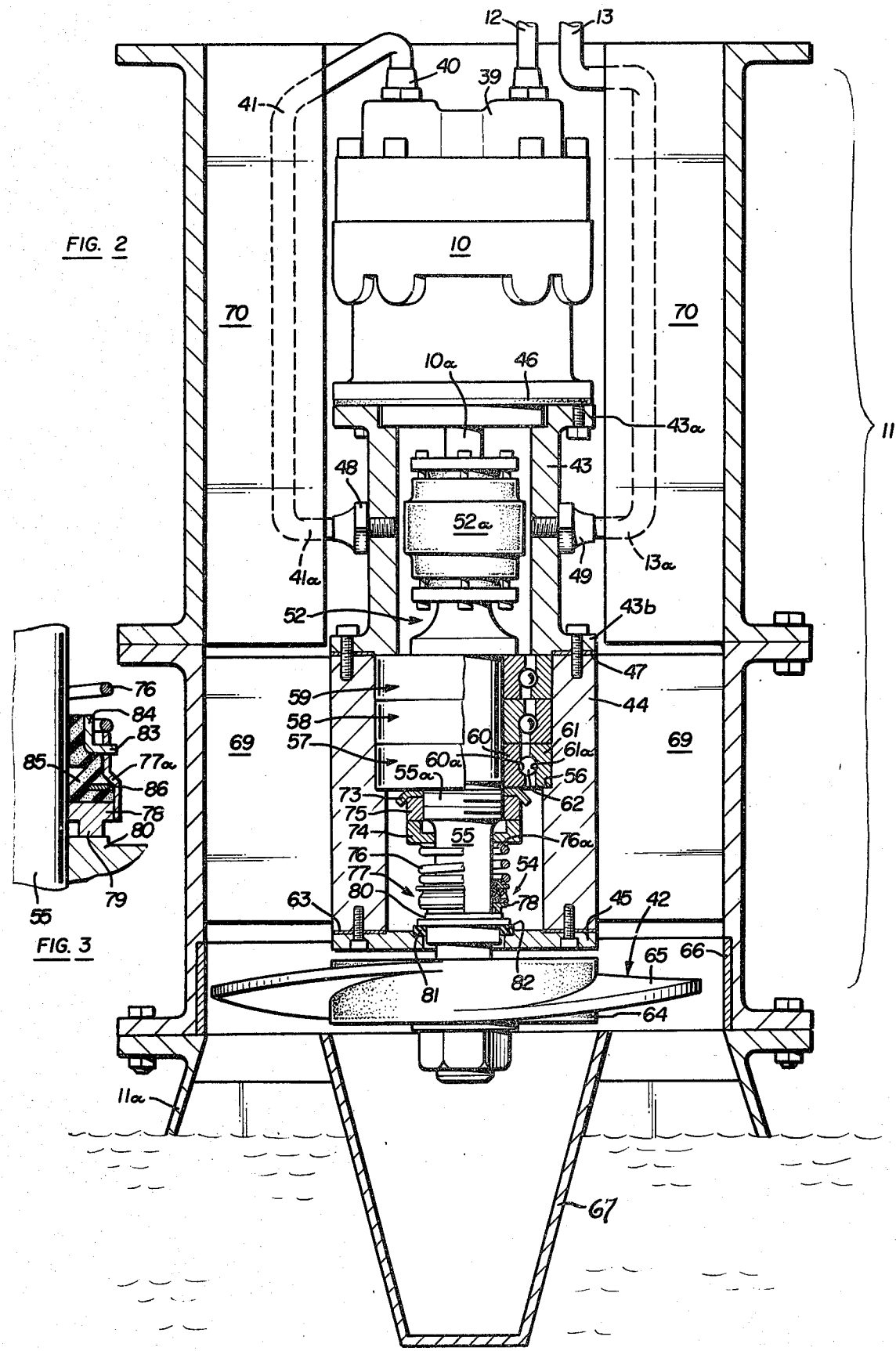

HYDRAULIC TURBINE SYSTEM

BACKGROUND OF THE INVENTION

Known hydroelectric generating equipment systems have mechanical drawbacks which substantially limit their economic utilization—particularly at low head sites. Particularly, all known types require a direct mechanical connection between the turbine and the generator. Known low-head axial turbine equipment are of three types: (1) The rim-generator type—in which the generator rotor is located on the periphery of the turbine runner; (2) the tube-type—in which the generator is located outside the water passage and connected to the turbine through an extended drive shaft; and (3) the bulb tubine type—in which both the runner and the generator are directly connected and enclosed within the water passage.

All three types require expensive complicated concrete Civil Works to encase and structurally support the turbine and generator in a common housing. There are also problems in matching up turbine speeds with generator speed requirements, accessibility for maintenance purposes to the important components and the inability to install most known equipment into most already existing dams or structures.

The following described invention proposes to solve all of the above problems and more, by allowing a physical separation of the turbine and the generator and accomplishing several other required features (such as synchronous generator speed control) through the unique application of certain fluid drive components.

SUMMARY OF THE INVENTION

A hydraulic turbine system is provided in which water turbine blades drive a hydraulic pump which drives a hydraulic motor mechanically coupled to a generator. The pump and blades may be unified in an axial flow submersible unit. The hydraulic motor, generator device and a reservoir may be located remotely from the turbine unit.

In the drawings:

FIG. 2 is a sectional view of an axial flow submersible unit;

FIG. 3 is a fragmentary view of a seal;

Figure 1:
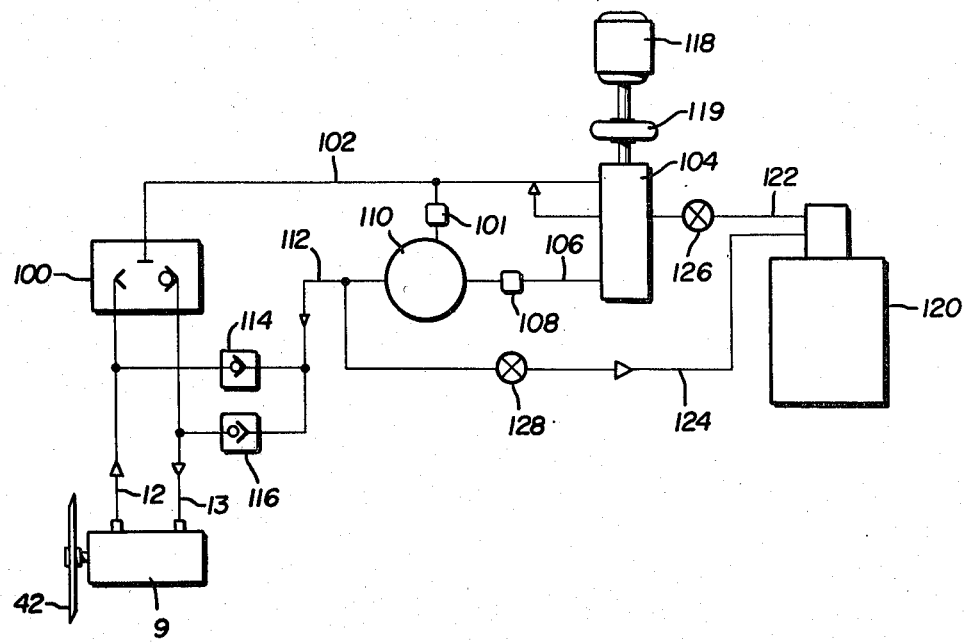
FIG. 1 is a schematic drawing of a hydraulic turbine system in accordance with one embodiment of the invention.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

The hydraulic system of the present invention includes an axial flow submersible turbine-driven pump unit 9 which includes a hydraulic pump 10 of known design mounted inside a casing 11. The hydraulic pump 10 has a rotary output shaft coupled to the impeller of an axial flow turbine, which is located inside the casing 11 just above the latter's discharge bell 11a (FIG. 2). In some embodiments, the pump 10 is a rotary, reversible pump.

FIG. 2 shows the submersible turbine-driven pump unit in detail. The sections of the annular casing 11 and its discharge bell 11a are bolted or otherwise rigidly attached end-to-end. This pump 10 has a hydraulic fitting 39, connected to the lower end of a hose 12, and a hydraulic fitting 40 connected through a reversely-bent, rigid pipe 41 that extends down outside the hydraulic pump parallel to the axis of the water turbine unit and has its lower end bent radially inward at 41a.

A three-piece annular housing is sealingly engaged axially between the hydraulic pump 10 and the turbine 42 in this under water turbine-driven pump unit. This housing comprises an upper cylindrical section 43, a middle cylindrical section 44, and a bottom end plate 45. The upper cylindrical section 43 of this housing is bolted at an annular, radial flange 43a on its upper end to the casing of the hydraulic pump 10, and it is bolted to the middle housing section 44 at a similar flange 43b on its lower end. Suitable liquid-tight sealing gaskets 46 and 47 are engaged respectively between the upper end flange 43a and the pump casing and between the lower end flange 43b and the top of the middle housing section 44 to prevent leakage.

The inturned lower end 41a of pipe 41 is rigidly connected through a metal fitting 48 to the upper housing section 43, and it communicates with the interior of this housing through this fitting.

At the opposite side of the upper housing section 43, the lower end of a hose 13 (which extends back up to the sump in the unit at ground level) is turned in radially at 13a and is connected here through a similar metal fitting 49 to the housing section 43.

A connecting shaft arrangement of known design, designated in its entirety by the reference numeral 52, extends axially between the hydraulic pump 10 and the turbine 42. It includes a slidable jaw coupling 52a connecting the output shaft 10a of the pump to the turbine shaft 55 and permitting a certain amount of axial displacement of either shaft with respect to the other, such as in case of expansion or contraction with temperature changes. This connecting shaft arrangement extends centrally through the three-piece annular housing 43, 44, 45, and it is rotatably supported in the end plate 45 of this housing by an arrangement described hereinafter. A liquid-tight seal 54 of known design prevents leakage around the turbine shaft 55 at the lower end plate 45 of the housing.

An annular sealing gasket 63 is clamped axially between the end plate 45 and the middle housing section 44 to prevent leakage between them.

A bearing assembly is engaged axially between the lower end of the upper housing section 43 and an internal upwardly facing, annular shoulder 56 on the middle housing section 44. In FIG. 2 this bearing assembly comprises three ball bearings 57, 58 and 59 are arranged end-to-end and each constituting both a radial bearing and an axial thrust bearing.

The lower-most of these bearings (57) has an annular inner race 60, an annular outer race 61, and balls 62 engaged radially between these races. The inner race 60 presents an upwardly-facing shoulder 60a below the balls 62 and the outer race 61 presents a downwardly-facing shoulder 61a above these balls. With this arrangement, the bearing unit 57 will resist an upward axial thrust on the connecting shaft arrangement 52.

Both the middle bearing 58 and the upper bearing 59 have essentially the reverse configuration of the races, with the inner race having a downwardly-facing shoulder that engages the balls, and the outer race having an upwardly-facing ball-engaging shoulder. Consequently, both of these bearings 58 and 59 oppose a downward axial thrust on the connecting shaft arrangement 52.

It will be evident from FIG. 2 that the upper end of the upper bearing 59 communicates with the interior of the upper housing section 43 around the connecting shaft arrangement 52. Consequently, the hydraulic liquid in the interior of this housing section 43 lubricates the bearings 59, 58 and 57 which support the connecting shaft arrangement for rotation and withstand axial thrusts in either direction on this connecting shaft arrangement.

This shaft seal is located below a lock nut 75, which is threadedly mounted on a screw-threaded portion 55a of the pump shaft 55 directly below a washer 73 engaging the bottom of the lowermost bearing unit 57. An annular spacer 74 engages the bottom of the nut 75 and encircles the pump shaft 55 just below its screw threads 55a.

The shaft seal 54 includes a compression coil spring 76 whose upper end engages a retainer 76a that abuts against the bottom of the spacer 74. The lower end of this spring is seated against the upper end of an annular retainer 77 which holds a carbon mating ring 78 at its lower end. The nut 75, spacer 74, retainer 77 and mating ring 78 are rotatable as a unit, in unison with the shaft 55.

As shown in FIG. 3, the mating ring 78 has a downwardly-offset, annular central segment 79 which bears down against a stationary ceramic ring 80. The engaging surfaces of the carbon and ceramic rings 78 and 80 are lapped to provide a fluid-tight seal around the turbine shaft.

The stationary ring 80 is seated in a ring-shaped holder 81 of rubber-like material, which is mounted in an upwardly-facing, central, annular recess 82 in the bottom retainer plate 45 of the three-piece housing 43, 44, 45.

The annular retainer 77 at its upper end has circumferentially-spaced, upwardly-facing notches or recesses which snugly receive corresponding radially outwardly-projecting fingers 83 on an annular driving band 84, which extends up from the retainer 77 inside the coil spring 76.

An annular, flexible and resilient bellows 85 of rubber-like material surrounds the turbine shaft 55 and is held tightly against the shaft around the latter's entire circumference by the driving band 84 near its upper end. The lower end of this annular bellows is held against the top of the rotating mating ring 78 by the retainer 77. As best seen in FIG. 3, the retainer 77 is offset radially inward at 77a and just below this location a flat annular disc 86, which fits snugly inside the retainer 77, holds the radially outwardly-extending lower end lip of bellows 85 snugly against the top of ring 78. The bellows 85 has one or more folds along its length.

This particular type of shaft seal has been found to be advantageous in preventing the entry of foreign particles, normally found in water, from entering the bearings 57-59 and intefering with their extremely vital function of centering and rotatably supporting the turbine shaft. In previous installations of the axial-flow type the shaft seal has been the principal trouble spot because of its tendency to cause excessive wear on the turbine shaft, which had the result of keeping the unit out of operation frequently and for relatively long periods of time. With the improved operation made possible by this particular shaft seal, the bearings 57-59 properly center the pump shaft 55 and keep it aligned axially with the pump shaft 10a and produce no excessive wear on the turbine shaft. In turn, this makes possible the use of the slidable jaw coupling 52a between these shafts, which prevents the axial expansion and contractions of the pump shaft 10a from being imparted to the turbine shaft 55.

The turbine 42 has a rotor consisting of a central hub 64, rigidly secured to shaft 55, and outwardly projecting, curved impeller blades 65 whose outer edges have a close running fit inside a cylindrical liner 66, which is secured to the inside of the lower section of casing 11 at the latter's lower end. A frusto-conical nose 67 extends down axially from the rotor hub 64.

A plurality of circumferentially spaced, radially disposed spacers 69 are welded to the inside of the lower segment of casing 11 and have their inner ends welded to the outside of the middle housing section 44 to center the three-piece housing 43—45 inside the casing 11.

At the same circumferential locations, a plurality of radially disposed stationary blades 70 are welded to the inside of the upper section of casing 11 and extend inward therefrom, terminating at their inner edges just short of the housing of the hydraulic pump 10.

These aligned radial stationary blades 69, 70 serve to channel the output flow from the turbine casing 65 into separate substantially axial streams, which flow down inside the casing 11 and then merge with each other as they flow down into the turbine blade rotor below and out through the discharge bell.

In accordance with the present invention, the water flow may be in either axial direction of the turbine-driven pump unit 9, or it may flow in one direction at one time and in the opposite direction at another time as in tidal water applications.

When water is flowing in the upward axial direction as viewed in FIG. 2, it will rotate the turbine 42 counterclockwise as viewed from the bottom and cause the pump 10 to pump oil in through line 13 and out through line 12. Conversely, when water is flowing in the downward axial direction as viewed in FIG. 2, it will rotate the turbine 42 clockwise as viewed from the bottom and cause the pump 10 to pump oil in through line 12 and out through line 13.

The turbine-driven pump unit 9 of FIG. 1 is placed under water in a river, or a tidal basin, or an ocean current or other body of water where there is current. The impeller of the turbine 42 will rotate either clockwise or counterclockwise depending on the direction of water flow.

FIG. 1 specifically shows a hydraulic turbine system in which the hydraulic turbine 42 drives pump 10 to pump oil in through line 13 and out through line 12. The turbine 42 is driven by water flowing from left to right as viewed in FIG. 1 within the turbine 42 shown schematically at the left. This corresponds to flow in the upward direction in FIG. 2.

Lines 12 and 13 of turbine-driven pump unit 9 are connected to a shuttle valve 100 which connects one or the other of these lines at a time to the supply line 102 that leads to a hydraulic motor 104. A return line 106 leads through a filter 108 to a hydraulic oil reservoir and heat exchanger 110. Another return line 112 is connected to two one-way check valves 114 and 116 which are coupled respectively to lines 12 and 13. The check valves will allow flow to pass only in the return direction, and one or the other of the check valves is opened at a given time.

For the direction indicated by the arrows in FIG. 1 just above the turbine-driven pump unit 9, the oil flows from unit 9 through line 12 to the shuttle valve 100 which connects line 12 to the supply line 102. The oils flows through the motor 104 causing the motor to drive an electrical generator 118 through coupling 119 for generating electrical current. The oil returns from motor 104 through line 106, reservoir 110, line 112, check valve 116 and line 13 to the hydraulic pump 10 driven by turbine 42. Thus, the energy of the flowing water is utilized by the hydraulic turbine system to generate electricity. The generator constitutes a utilization device.

A standby diesel driving unit 120 may be connected in parallel with the hydraulic system. The diesel driving unit has a supply outlet line 122 connected to supply line 102 and a return line 124 connected to return line 112. Manual valves 126 and 128 are located in lines 122 and 124 respectively. Thus, if an occasion exists where no water current is flowing, the turbine-driven pump unit 9 does not operate and the standby diesel unit 120 may be operated with valves 126 and 128 open to operate the hydraulic motor 104 and thus drive the electrical generator 118. Such conditions might occur at high tide or at low tide in a tidal basin application. When there is water current and turbine-driven pump unit 9 is operating, the valves 126 and 128 are closed.

In such a tidal basin application, the hydraulic turbine 42 may be utilized to operate bi-directionally. The condition where water is flowing from left to right has already been described. If water is flowing from right to left as viewed in FIG. 1, the impeller of the turbine 42 would be driven in the reverse direction causing oil to be pumped out from pump 10 through line 13 and return through line 12. The shuttle valve 100 will automatically connect line 13 to line 102, and check valve 114 would be open and check valve 116 would be closed. Thus, oil would flow through line 13, shuttle valve 100 and supply line 102 to operate the motor 104 which drives the electrical generator 118. The oil would return through line 106, reservoir 110, line 112, check valve 114 and line 12 to the hydraulic pump 10 of the turbine-driven pump unit 9. In this case, oil flows in the reverse of the direction indicated by the arrows appearing just above the unit 9.

Figure 4:
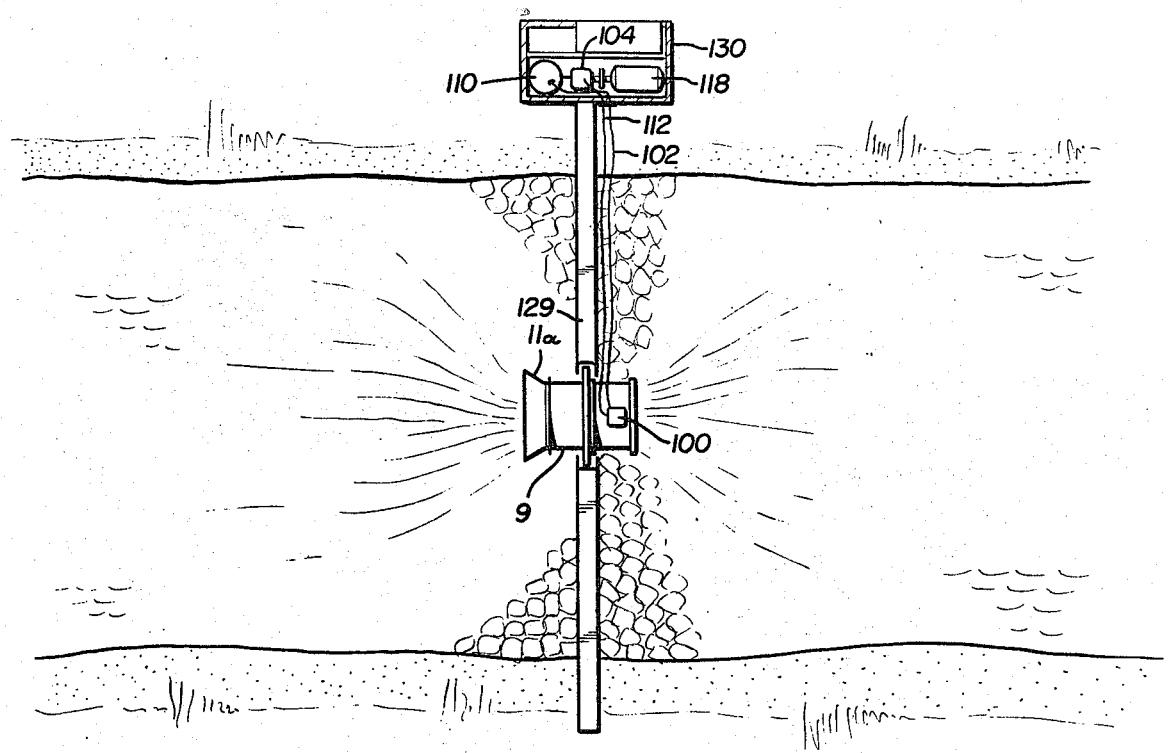
FIG. 4 is a plan view of another embodiment.
Figure 5:
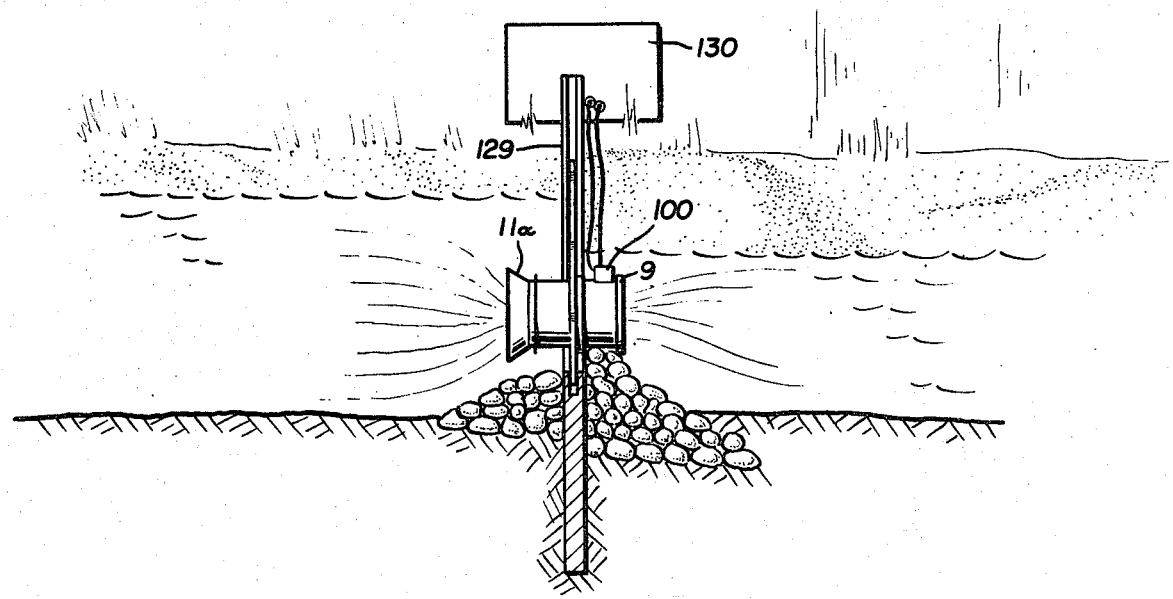
FIG. 5 is an elevational view of the embodiment of FIG. 4.

FIGS. 4 and 5 illustrate an application of the hydraulic system wherein the turbine-driven pump unit 9 is submerged in a river with the turbine intake bell 11a upstream. The unit 9 is mounted in a gate of dam 129 which causes the water to flow through the hydraulic turbine 42. All of the other elements of the system are located on a pad 130 on the shore. It may be seen that the line 102 leads from shuttle valve 100 to the motor 104 which in turn is connected to the hydraulic reservoir 110. The return line 112 leads from the reservoir 110 back to the shuttle valve 100 and the hydraulic turbine-driven pump 10. The electrical generator 118 is also mounted on the pad 130 on dry land.

With the type of installation shown in FIGS. 4 and 5, it is clear that electricity can be generated with a relatively simple installation. The only equipment which needs to be mounted in the dam 129 across the river is the hydraulic turbine-driven pump unit 9. The rest of the equipment may be constructed and mounted relatively easily on shore at a location somewhat remote from the hydraulic turbine-driven pump unit 9. The dam 129 can be much simpler than if the generator had to be mounted directly on or in the dam.

Figure 6:
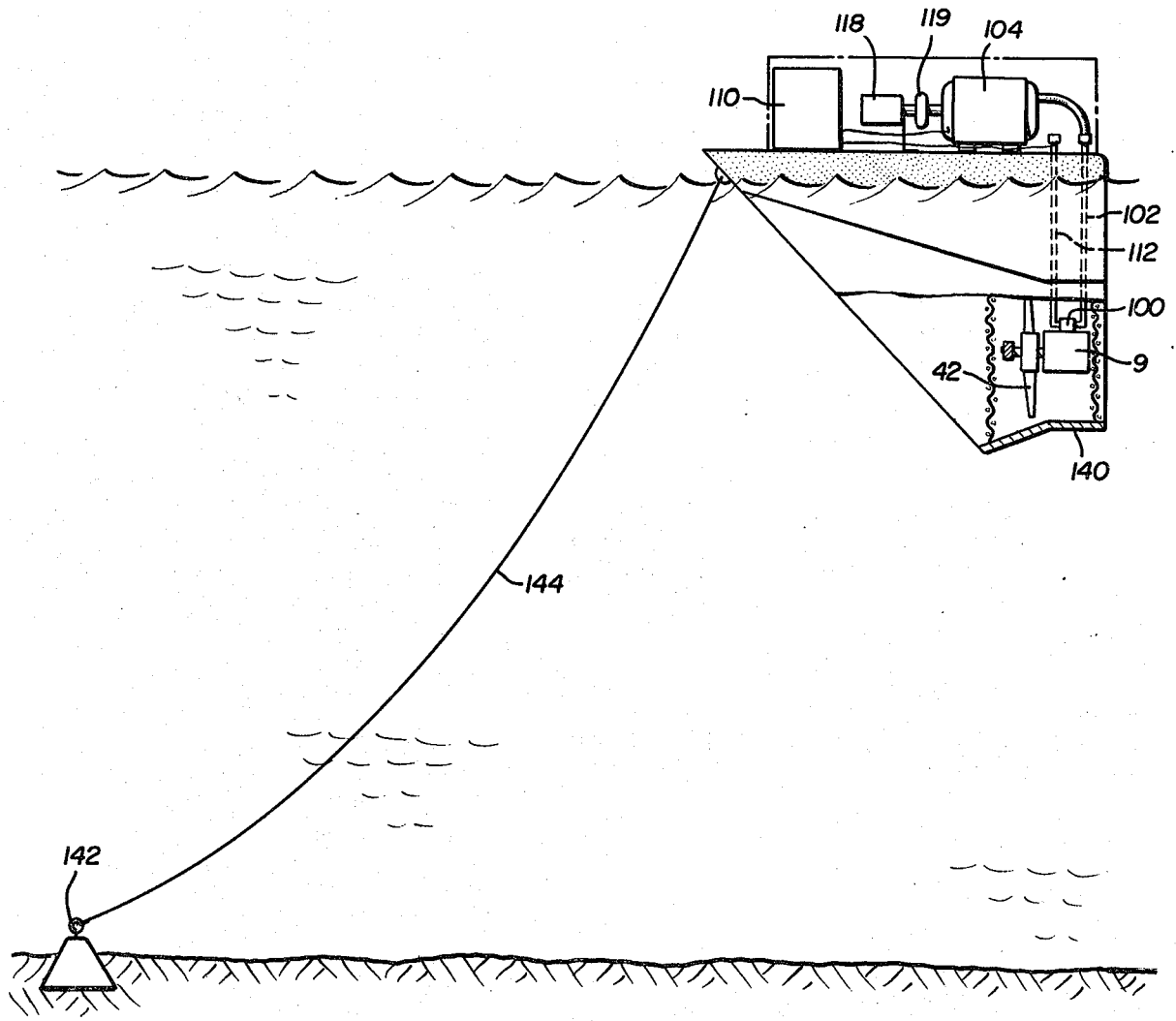
FIG. 6 is an elevational view of a further embodiment.

FIG. 6 shows an installation wherein the hydraulic turbine-driven pump unit 9 is mounted on a barge 140 which floats in a body of water having current such as the Gulfstream. Line 102 leads from valve 100 to the hydraulic motor 104 which is located above sea level on the barge 140. The motor drives an electrical generator 118 through a coupling 119. Return line 112 is connected to the reservoir 110. The bare is held in place by an anchor 142 and line 144.

Hydraulic motor speeds can be adjusted to drive the generator at synchronous speeds by bypassing through bypass 101 (FIG. 1) into the hydraulic reservoir hydraulic oil from the turbine or utilizing a variable displacement hydraulic motor which adjusts generator speed automatically by adjusting piston stroke through a governor controlled servo controlled valve.

I claim:
1. A hydraulic hydroelectric turbine system comprising:
an electric generator;
rotary turbine blades;
hydraulic pump means for operation by rotation of said turbine blades;
hydraulic motor means operatively mechanically coupled to said generator for driving the same and having an inlet and an outlet;
a hydraulic fluid reservoir hydraulically coupled to said outlet of said motor means;
and connecting means including hydraulic lines connecting said pump means respectively to said inlet of said hydraulic motor means and, to said reservoir in a closed hydraulic loop for operating said motor means by hydraulic fluid pumped by said pump means in response to rotation of said turbine blades by water flow.

2. The hydraulic turbine system of claim 1 in which:
said pump means is reversible;
and said connecting means include a shuttle valve connected between said pump means and the inlet of said hydraulic motor means for automatically operating the latter in either direction of operation of said pump means, and check valves operatively connecting the opposite sides of said pump means to said reservoir.

3. The hydraulic turbine system of claim 2 in which:
said hydraulic pump means is a rotary, reversible, hydraulic pump.

4. A hydraulic hydroelectric turbine system comprising:
an electric generator;
rotary turbine blades;
hydraulic pump means for operation by rotation of said turbine blades;
said turbine blades being coupled to said pump means by a shaft bearing arrangement which is lubricated by oil from said pump means;
hydraulic motor means operatively mechanically coupled to said generator for driving the same and having an inlet and an outlet;
a hydraulic reservoir hydraulically coupled to said outlet of said motor means;
and connecting means for hydraulically connecting said pump means to said hydraulic motor means and said reservoir for operating said motor means in response to rotation of said turbine blades by water flow.

5. The hydraulic turbine system as claimed in claim 4 in which:
said turbine blades and said pump means are unified in an axial flow unit.

* * * * *